(12) United States Patent
Katsura et al.

(10) Patent No.: US 11,133,732 B2
(45) Date of Patent: Sep. 28, 2021

(54) ROTATIONAL ELECTRIC MACHINE (71) Applicant: EXEDY CORPORATION, Neyagawa (JP)

(72) Inventors: Hitoshi Katsura, Neyagawa (JP); Taichi Kitamura, Neyagawa (JP); Kimitaka Uemura, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 218 days.

(21) Appl. No.: 16/392,148

(22) Filed: Apr. 23, 2019

(65) Prior Publication Data
US 2019/0334423 A1 Oct. 31, 2019

(30) Foreign Application Priority Data
Apr. 27, 2018 (JP) .............................. JP2018-087325

(51) Int. Cl.
*H02K 7/00* (2006.01)
*H02K 7/10* (2006.01)
(Continued)

(52) U.S. Cl.
CPC ........... *H02K 19/103* (2013.01); *H02K 7/006* (2013.01); *H02K 7/10* (2013.01); *H02K 7/108* (2013.01);
(Continued)

(58) Field of Classification Search
CPC .......... H02K 7/10; H02K 7/006; H02K 7/108; H02K 7/1912; H02K 7/24; H02K 7/26; H02K 7/103; B60K 6/26; B60K 2006/268
See application file for complete search history.

(56) References Cited

U.S. PATENT DOCUMENTS 4,958,095 A    9/1990 Uchida et al.
4,959,595 A *  9/1990 Nishimura ............. F02N 11/04
                                                    290/46
(Continued)

FOREIGN PATENT DOCUMENTS

JP         5879668    *  5/1983
JP       03141819 A   *  6/1991
(Continued)

OTHER PUBLICATIONS

Uchida, Machine Translation of JP03141819, Jun. 1991 (Year: 1991).*
(Continued)

*Primary Examiner* — Quyen P Leung
*Assistant Examiner* — Eric Johnson
(74) *Attorney, Agent, or Firm* — United IP Counselors, LLC (57) ABSTRACT

A brushless winding field rotational electric machine positioned between a starting device and a case enclosing the starting device includes: a stator, which is held to the case, including an alternating-current coil configured to generate a rotation magnetic field by alternating current; a field core, which is held to the case, including a field coil to be excited by direct current; and a rotor disposed on an outer periphery of the starting device and rotatably held about a rotational axis relative to the stator and the field coil. The rotor includes a connection portion to be connected to a synchronized rotation member configured to rotate in synchronization with an engine along the rotational axis, on a facing surface to the synchronized rotation member.

4 Claims, 8 Drawing Sheets

(51) Int. Cl.

| | | |
|---|---|---|
| *H02K 7/108* | (2006.01) | |
| *H02K 19/10* | (2006.01) | |
| *H02K 19/12* | (2006.01) | |
| *H02K 19/24* | (2006.01) | |
| *H02K 19/26* | (2006.01) | |
| *H02K 1/16* | (2006.01) | |
| *H02K 3/04* | (2006.01) | |
| *H02K 5/04* | (2006.01) | |

(52) U.S. Cl.
CPC ............. *H02K 19/12* (2013.01); *H02K 19/24* (2013.01); *H02K 19/26* (2013.01); *H02K 1/16* (2013.01); *H02K 3/04* (2013.01); *H02K 5/04* (2013.01)

(56) References Cited

U.S. PATENT DOCUMENTS

| | | | |
|---|---|---|---|
| 5,955,807 A | | 9/1999 | Kajiura et al. |
| 6,133,702 A | * | 10/2000 | Noble ........................ H02P 9/02 |
| | | | 318/158 |
| 9,434,176 B1 | | 9/2016 | Kroon |
| 2002/0158523 A1 | | 10/2002 | Abadia et al. |
| 2009/0184601 A1 | | 7/2009 | Dubus et al. |
| 2009/0283344 A1 | | 11/2009 | Arnold et al. |
| 2013/0154410 A1 | | 6/2013 | Morita et al. |
| 2017/0218910 A1 | | 8/2017 | Sato et al. |

FOREIGN PATENT DOCUMENTS

| | | |
|---|---|---|
| JP | H10-304633 A | 11/1998 |
| JP | H11-243672 A | 9/1999 |
| JP | 3445492 B2 | 9/2003 |
| JP | 2004-072827 A | 3/2004 |
| JP | 3704881 B2 | 10/2005 |
| JP | 2009-508464 A | 2/2009 |
| JP | 2010-516558 A | 5/2010 |
| JP | 4782348 B2 | 9/2011 |
| JP | 4787242 B2 | 10/2011 |
| JP | 2016-211591 A | 12/2016 |
| JP | 2017-013495 A | 1/2017 |
| JP | 2017-136902 A | 8/2017 |
| WO | 2012-029707 A1 | 3/2012 |
| WO | 2018/012170 A1 | 1/2018 |
| WO | 2018/139561 A1 | 8/2018 |

OTHER PUBLICATIONS

Bitou, Machine Translation of JP5879668, May 1983 (Year: 1983).*
Matsuoka, Machine Translation of WO2018012170, Jan. 2018 (Year: 2018).*
Dictionary.com, Pawl Definition (Year: 2021).*
U.S. Appl. No. 16/392,101, filed Apr. 23, 2019 in the name of Katsura et al.
U.S. Appl. No. 16/392,222, filed Apr. 23, 2019 in the name of Katsura et al.
Extended European Search Report for the corresponding European Patent Application No. 19171298.3, dated Sep. 6, 2019, 8 pp.

* cited by examiner

ROTATIONAL ELECTRIC MACHINE

CROSS-REFERENCE TO RELATED APPLICATION

This application claims the benefit of Japanese Patent Application No. 2018-087325, filed Apr. 27, 2018.

BACKGROUND OF THE INVENTION

Field of the Invention

The present invention relates to a brushless winding field rotational electric machine disposed on an outer periphery of a starting device.

Description of the Related Art

Patent Document 1 discloses a torque converter connected to a drive plate.

PRIOR ART DOCUMENT

Patent Document

Patent Document 1: Japanese Patent Laid-open No. 2016-211591

SUMMARY OF THE INVENTION

In the torque converter, the drive plate is fastened by a bolt or a nut to a nut or a bolt welded to a case thereof, which potentially leads to an increased number of components. As the number of components increases, it may be difficult to reduce the size and weight of a rotational electric machine including the torque converter or simplify the structure thereof.

It is an object of the present invention to provide a rotational electric machine in which increase in the number of components is reduced.

To achieve the object, the present invention is configured as described below.

According to an aspect of the present invention, a brushless winding field rotational electric machine positioned between a starting device and a case enclosing the starting device includes: a stator, which is held to the case, including an alternating-current coil configured to generate a rotation magnetic field by alternating current; a field core, which is held to the case, including a field coil to be excited by direct current; and a rotor disposed on an outer periphery of the starting device and rotatably held about a rotational axis relative to the stator and the field coil. The rotor includes a connection portion to be connected to a synchronized rotation member configured to rotate in synchronization with an engine along the rotational axis, on a facing surface to the synchronized rotation member.

According to the aspect of the present invention, the rotor includes the connection portion to be connected to the synchronized rotation member. In the rotational electric machine with this configuration, any member for connecting the starting device and the synchronized rotation member can be omitted, which leads to reduction of increase in the number of components.

DETAILED DESCRIPTION OF THE INVENTION

An embodiment of the present invention will be described below in detail with reference to the accompanying drawings.

First Embodiment

Figure 1:
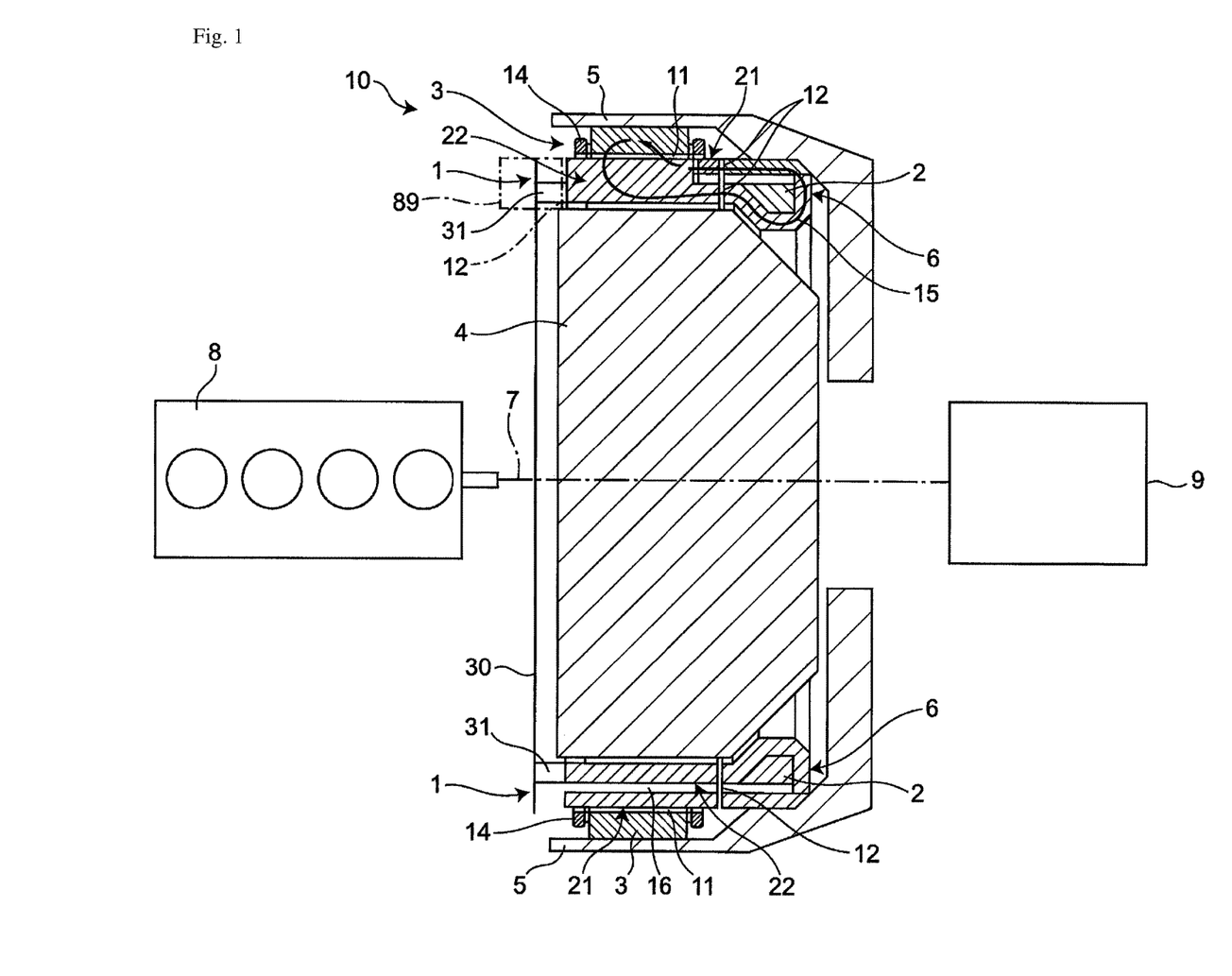
FIG. 1 is a cross-sectional view substantially taken along a direction orthogonal to the rotational axis of a rotational electric machine according to a first embodiment of the present invention, and an explanatory diagram illustrating the disposition relation between an engine and a transmission.
Figure 2:
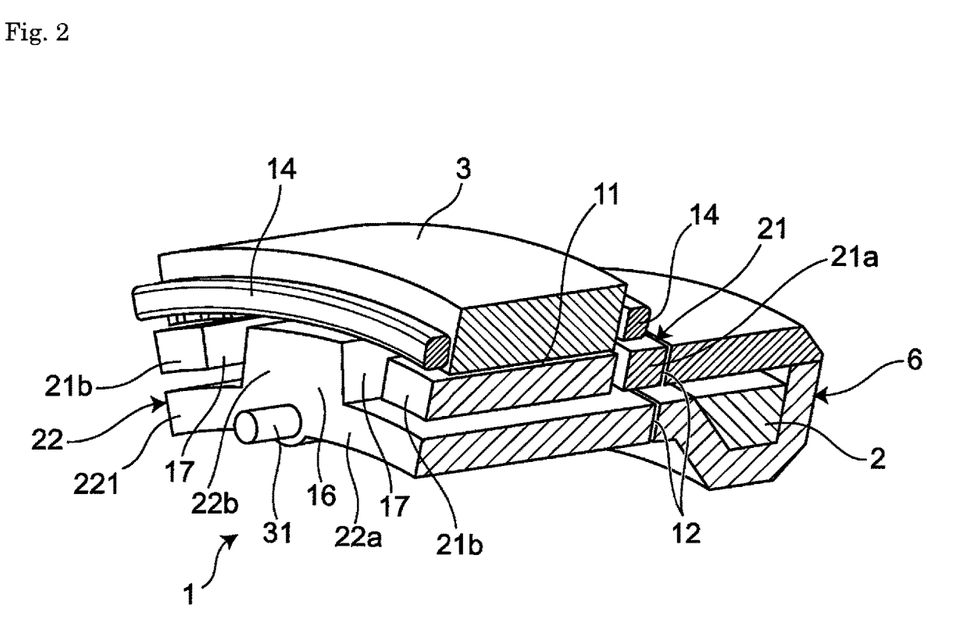
FIG. 2 is a perspective view of the rotational electric machine according to the first embodiment when cut in the direction orthogonal to the rotational axis.

As illustrated in FIGS. 1 to 2B, a rotational electric machine 10 according to a first embodiment of the present invention is a brushless winding field rotational electric machine 10 positioned between a starting device 4 and a case 5 enclosing the starting device 4. The rotational electric machine 10 includes at least a stator 3, a field coil 2, and a rotor 1. In the first embodiment, for example, the rotational electric machine 10 is disposed between an engine 8 and a transmission 9 along a rotational axis 7, but is not limited to such disposition. For example, the rotational electric machine 10 may be replaced with an alternator or may be disposed at an optional position such as a position between the transmission 9 and a wheel.

The stator 3 has a cylindrical member non-rotatably fixed and held to the case 5 and including a plurality of slots for winding an alternating-current coil 14. The stator includes the alternating-current coil 14 and generates a rotation magnetic field by alternating current flowing through the alternating-current coil 14.

The field coil 2 is shifted relative to the stator 3 and the rotor 1 in the rotational axis 7. The field coil 2 is fixed and held to the case 5 on the transmission 9 side of the stator 3, and excited by direct current. A field core 6 includes the field coil 2. The field coil 2 may be shifted to the engine side of the stator 3 through a second air gap 12, not to the transmission 9 side of the stator 3, relative to the stator 3 and the rotor 1 in the rotational axis 7 (refer to a region 89 illustrated with a dashed and single-dotted line in FIG. 1).

The rotor 1 is fixed to the outer periphery of the starting device 4. The outer peripheral surface of the rotor 1 faces the inner peripheral surface of the stator 3 and an end face of the rotor 1 on the transmission side faces an end face of the field coil 2 on the engine side. The rotor 1 is held rotatably relative to the stator 3 and the field coil 2 about the rotational axis 7

As illustrated in FIG. 1, the rotor 1 includes a connection portion 31 and is connected to a synchronized rotation member 30 configured to rotate in synchronization with an output shaft of the engine 8 through the connection portion 31. The rotational axis 7 aligns with the central axis of the output shaft of the engine 8. Accordingly, the output shaft of the engine 8 and the rotational axis 7 of the rotational electric machine 10 have an identical central axis.

In the first embodiment, for example, the starting device 4 is a torque converter, and the synchronized rotation member 30 is a drive plate connected to the torque converter on the engine side thereof. The starting device 4 may be a frictional clutch device.

As illustrated in FIG. 2, the connection portion 31 is provided on a facing surface 221 to the synchronized rotation member 30 of the rotor 1. Specifically, the connection portion 31 has a bolt shape protruding from the facing surface 221 in an extending direction of the rotational axis 7. The connection portion 31 is disposed on the facing surface 221 of a second circular ring portion 22a to be described later at a second magnetic pole 22 of the rotor 1 and on the inner side of a convex portion 22b to be described later in the radial direction of the rotational axis 7. In the first embodiment, for example, the rotor 1 includes a plurality of connection portions 31 disposed at intervals in the circumferential direction with respect to the rotational axis 7.

A first air gap 11 is formed between the stator 3 and the rotor 1 so that magnetic flux is transferred between the stator 3 and the rotor 1. The first air gap 11 extends in an axial direction of the rotational axis 7 between the inner peripheral surface of the stator 3 and the outer peripheral surface of the rotor 1.

The second air gap 12 is formed between the field core 6 and the rotor 1 so that magnetic flux is transferred between the field coil 2 and the rotor 1. The second air gap 12 extends in the radial direction orthogonal to the axial direction of the rotational axis 7 between the end face of the rotor 1 on the transmission side in the axial direction of the rotational axis 7 and an end face of the field core 6 on the engine side.

Accordingly, the field coil 2 is shifted in parallel relative to the rotor 1 in the axial direction of the rotational axis 7 through the second air gap 12.

Figure 3:
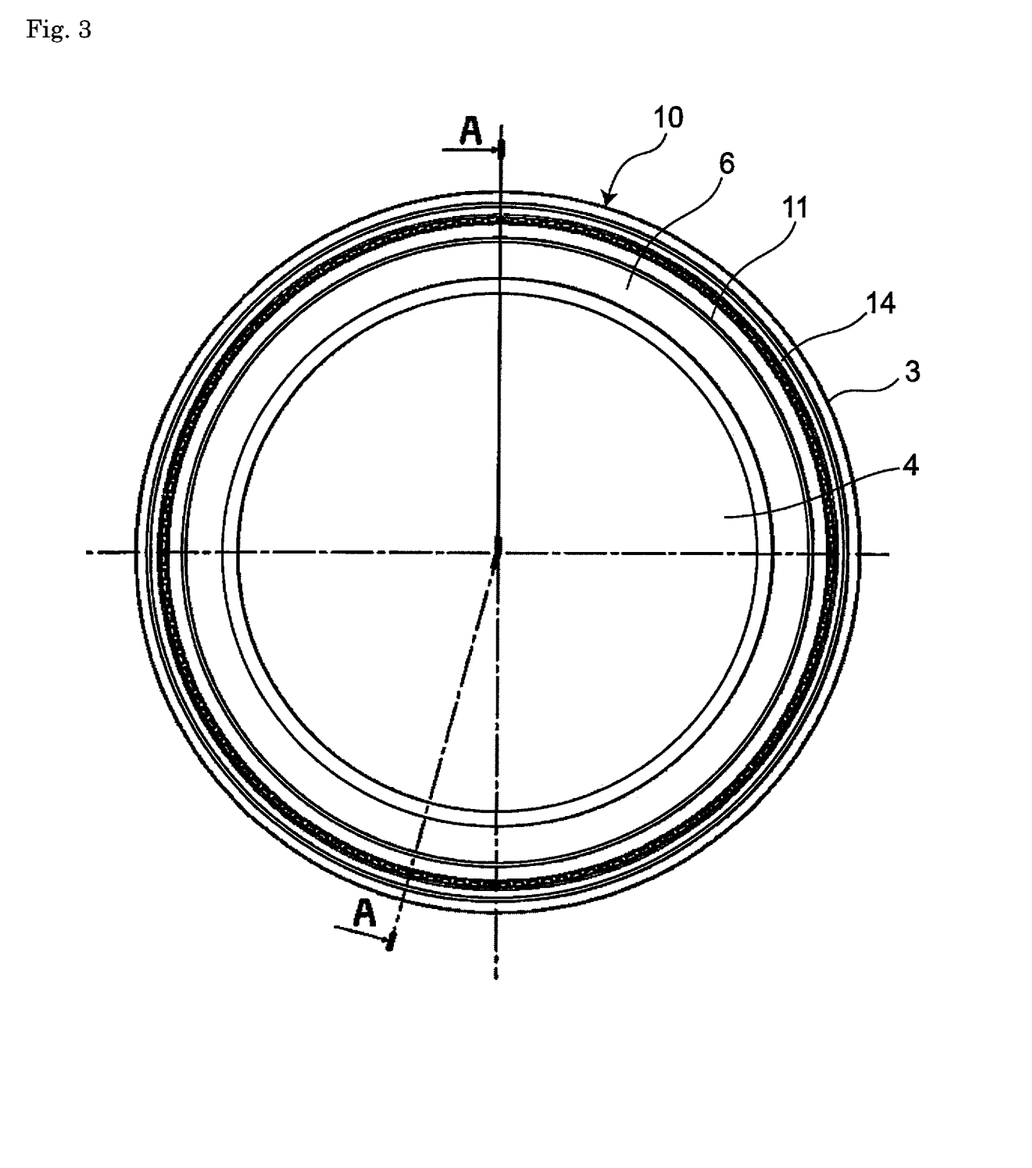
FIG. 3 is a front view of the rotational electric machine according to the first embodiment when viewed from a transmission side.
Figure 4:
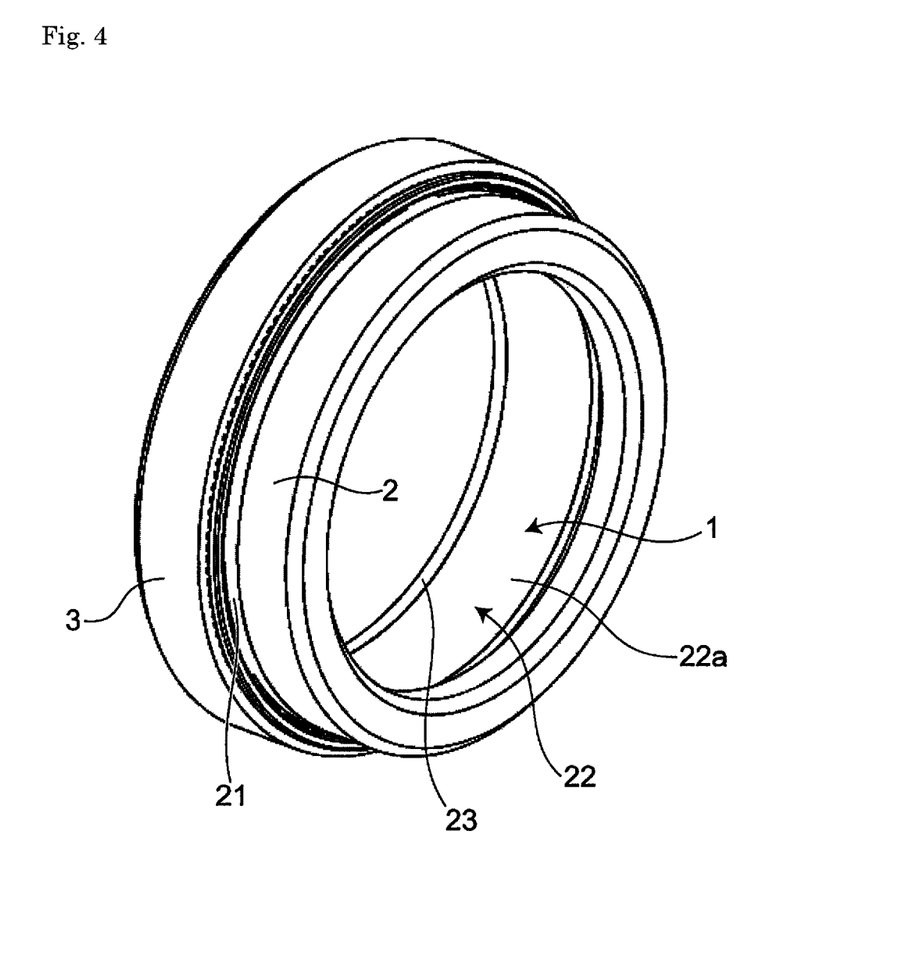
FIG. 4 is a perspective view of the rotational electric machine according to the first embodiment.
Figure 5:
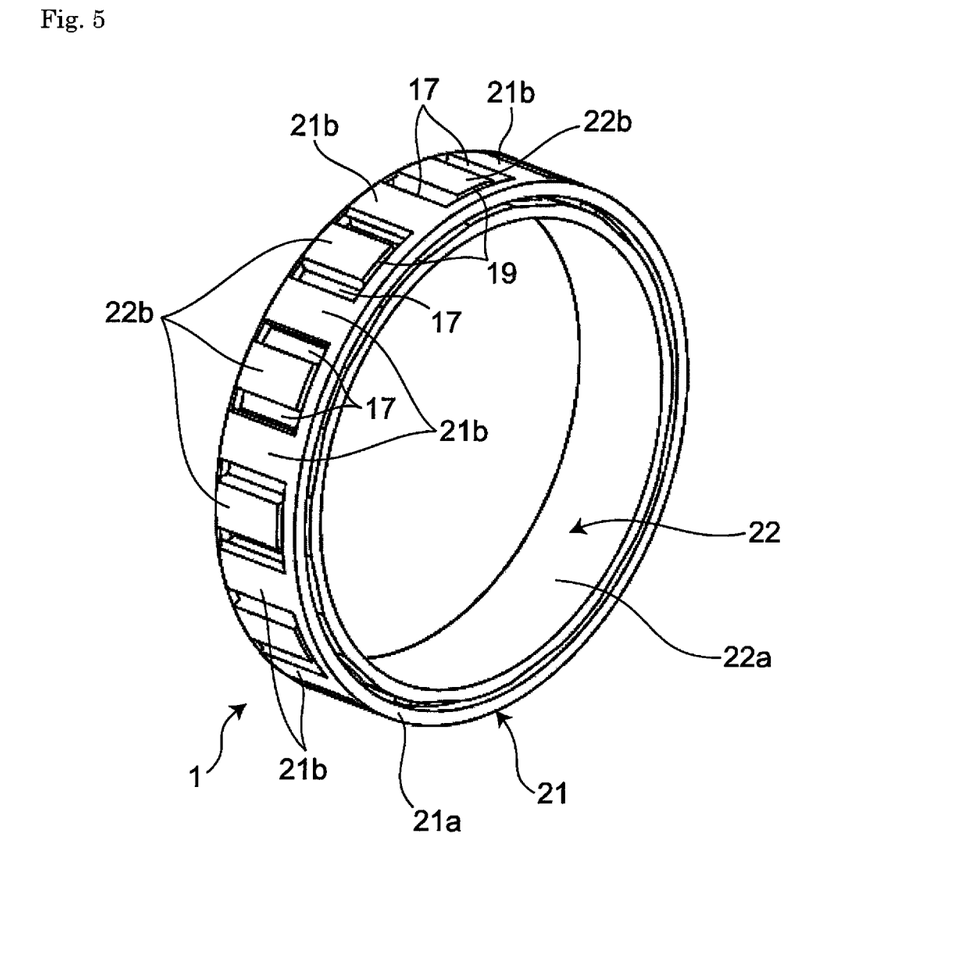
FIG. 5 is a perspective view of a rotor of the rotational electric machine according to the first embodiment.
Figure 6:
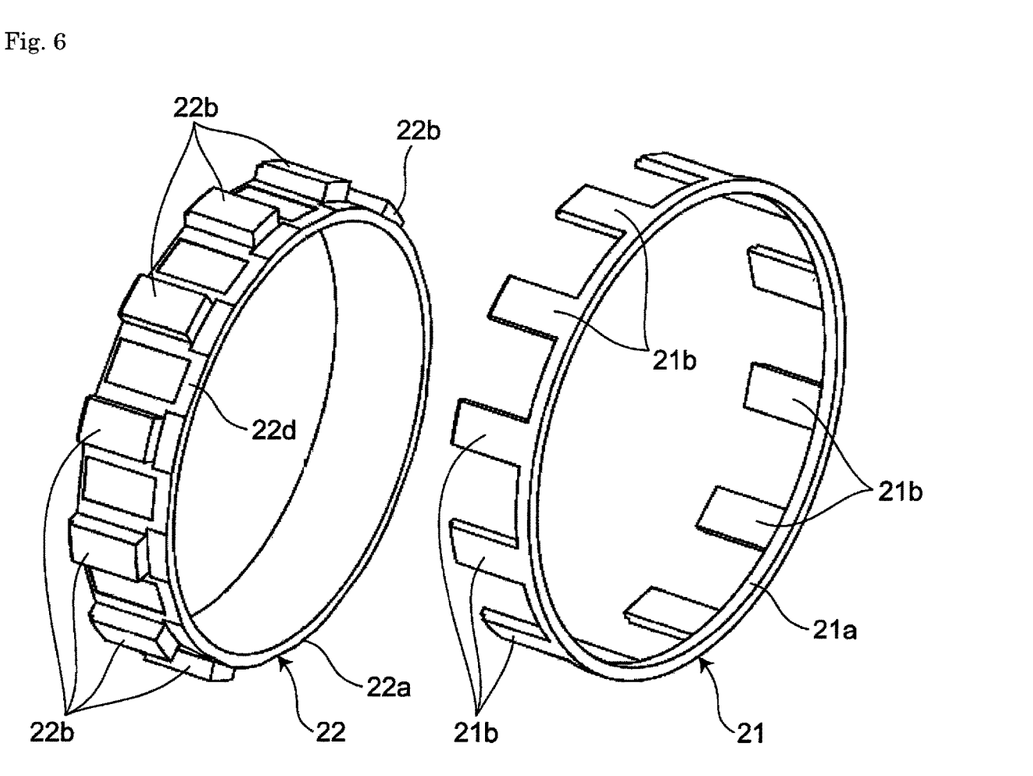
FIG. 6 is an exploded perspective view of the rotor of the rotational electric machine according to the first embodiment.

As illustrated in FIGS. 3 to 6, the rotor 1 is formed by combining a first magnetic pole 21 and the second magnetic pole 22. A cross-sectional view taken along line A-A in FIG. 3 is a cross-sectional view of the rotational electric machine 10, the starting device 4, and the like at the center in FIG. 1. FIGS. 5 and 6 omit illustration of the connection portion 31.

The first magnetic pole 21 is made of a soft magnetic body such as iron, and includes a plurality of pawl portions 21b each having, for example, a rectangular thin plate shape and protruding from a first circular ring portion 21a in the axial direction of the rotational axis 7. The pawl portions 21b are disposed at constant intervals, for example, at equal intervals in the circumferential direction, and have equal lengths in the axial direction of the rotational axis 7. The outer peripheral surface of each pawl portion 21b is disposed along the outer peripheral surface of the first circular ring portion 21a. The pawl portion 21b does not contact the second magnetic pole 22 even when the first magnetic pole 21 and the second magnetic pole 22 are combined with each other, and a radial direction gap 16 is formed in the radial direction of the rotational axis 7.

The second magnetic pole 22 is made of a soft magnetic body such as iron and disposed on an inner side of the first magnetic pole (in the present embodiment, the first circular ring portion 21a) through the radial direction gap 16 in a radial direction of the rotational axis 7. The second magnetic pole 22 includes a second circular ring portion 22a disposed partially overlapping the first magnetic pole (in the present embodiment, the first circular ring portion 21a) and a plurality of convex portions 22b. Each of the plurality of convex portions 22b, which has a rectangular plate shape for example, protrudes from an outer peripheral surface of the second circular ring portion 22a in the radial direction of the rotational axis 7 and has a circumferential direction gap 17 in a circumferential direction of the rotational axis 7. The convex portions 22b are disposed at constant intervals, for example, at equal intervals in the circumferential direction, and have equal heights in the radial direction of the rotational axis 7. The convex portions 22b have equal lengths in the axial direction of the rotational axis 7 and are shorter than the pawl portions 21b. The outer peripheral surface of each convex portion 22b is disposed on one circle having a center at the rotational axis of the rotor 1. Each convex portion 22b extends to an end edge of the second circular ring portion 22a on the engine side to form a first leading end lock portion 22c, but does not extend to an end edge of the second circular ring portion 22a on the transmission side to form a circular ring fitting portion 22d having a small width with no convex portion 22b. The first magnetic pole 21 is moved relative to the second magnetic pole 22 in the axial direction of the rotational axis 7 to insert each pawl portion 21b of the first magnetic pole 21 into a middle part of the circumferential direction gap 17 between the convex portions 22b adjacent thereto so that the pawl portions 21b and the convex portions 22b are alternately arranged in the circumferential direction of the rotational axis 7. In this case, the first circular ring portion 21a of the first magnetic pole 21 can be disposed on the outside of the fitting portion 22d with the radial direction gap 16 interposed therebetween. In the assembled state as illustrated in FIG. 5, an axial direction gap 19 is formed between the convex portions 22b and the first circular ring portion 21a, the circumferential direction gap 17 is formed in the circumferential direction of the rotational axis 7 between each pawl portion 21b and the corresponding convex portion 22b of the second magnetic pole 22, and the radial direction gap 16 is formed in the radial direction of the rotational axis 7. With this configuration, the first magnetic pole 21 and the second magnetic pole 22 are maintained in a non-contact manner through a non-magnetic body member disposed between the first magnetic pole 21 and the second magnetic pole 22 in the radial direction of the rotational axis 7.

In the rotational electric machine 10 configured as described above, field coil magnetic flux 15 occurs when the field coil 2 is energized. The field coil magnetic flux 15 starts from the field core 6 and returns to the field core 6 through a second air gap 12, the first magnetic pole 21 of the rotor 1, the first air gap 11, the stator 3, the first air gap 11, the second magnetic pole 22 of the rotor 1, and the second air gap 12. In this case, for example, when the field coil 2 is energized with direct current, the field coil magnetic flux 15 is generated and the first magnetic pole 21 and the second magnetic pole 22 are magnetized, for example, as a north pole and a south pole, respectively.

The following describes a case in which the rotational electric machine 10 as a starter executes a start function. An inverter (not illustrated) is driven based on a start command of the engine 8 to cause three-phase alternating current to flow through the stator 3 and magnetize the stator 3, and cause current to flow through the field coil 2. Current is caused to flow through the field coil 2, thereby exciting the first magnetic pole 21 and the second magnetic pole 22 of the rotor 1. As a result, the rotor 1 starts rotation relative to the stator 3, and electromotive force having induction voltage is generated at the stator 3.

Thereafter, when the induction voltage increases in accordance with the rotational speed of the rotor 1 and the rotational speed reaches an initial explosion rotational speed lower than an idling rotational speed corresponding to idling of the engine 8, which completes start of the engine 8, the drive of the inverter is stopped. Since then, transition is automatically made to a power generation mode in which the rotational electric machine 10 executes an electric generation function as an electric generator to hold predetermined induction voltage (request voltage).

In the power generation mode, the excitation current is adjusted so that the induction voltage is constant at the predetermined induction voltage to continuously excite the field coil 2. The excitation current is adjusted so that the magnetization force of the rotor decreases as the rotational speed increases and the induction voltage is kept constant. When the field coil 2 is not excited, the advance of the three-phase alternating current is adjusted by the inverter so that the induction voltage is constant at the predetermined induction voltage. Further, the above-described two methods may be combined to achieve the adjustment. With this control, the rotational electric machine 10 functions as an electric generator when the rotor 1 rotates.

As a result, when connected to the engine 8, the rotational electric machine 10 can start the engine and function as a generator (electric generator) in traveling.

In the rotational electric machine 10 according to the first embodiment, the rotor 1 includes the connection portion 31 to be connected to the synchronized rotation member 30. Thus, any member for connecting the starting device 4 and the synchronized rotation member 30 with each other can be omitted to achieve the rotational electric machine 10 in which increase in the number of components is reduced.

The connection portion 31 is disposed on the facing surface 221 of the second circular ring portion 22a and on the inner side of the convex portion 22b in the radial direction of the rotational axis 7. Accordingly, the connection portion 31 can be provided to the rotor 1 while the magnetic path of the second magnetic pole is prevented from narrowing.

Figure 7:
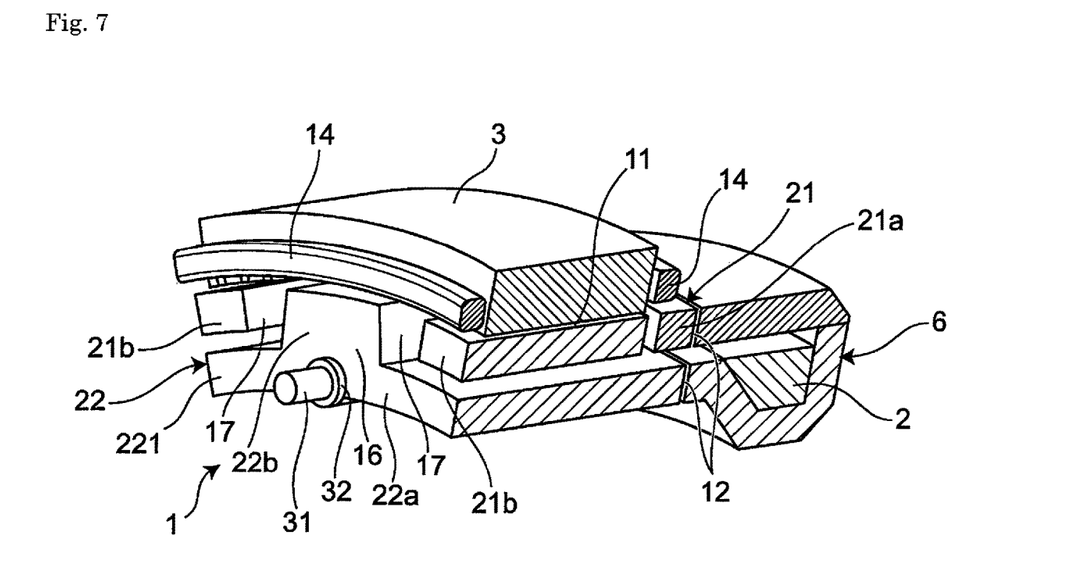
FIG. 7 is a perspective view of the rotational electric machine according to a modification of the first embodiment of the present invention when cut in the direction orthogonal to the rotational axis.

The connection portion 31 is not limited to a bolt shape, but may have a nut shape as illustrated in FIG. 7. In other words, the connection portion 31 may have a bolt shape or a nut shape. This increases the freedom of designing of the rotational electric machine 10.

The rotor 1 includes the plurality of connection portions 31 disposed at intervals in the circumferential direction with respect to the rotational axis 7. Accordingly, the rotor 1 can be more reliably connected to the synchronized rotation member 30. Only at least one connection portion 31 needs to be provided.

Second Embodiment

Figure 8:
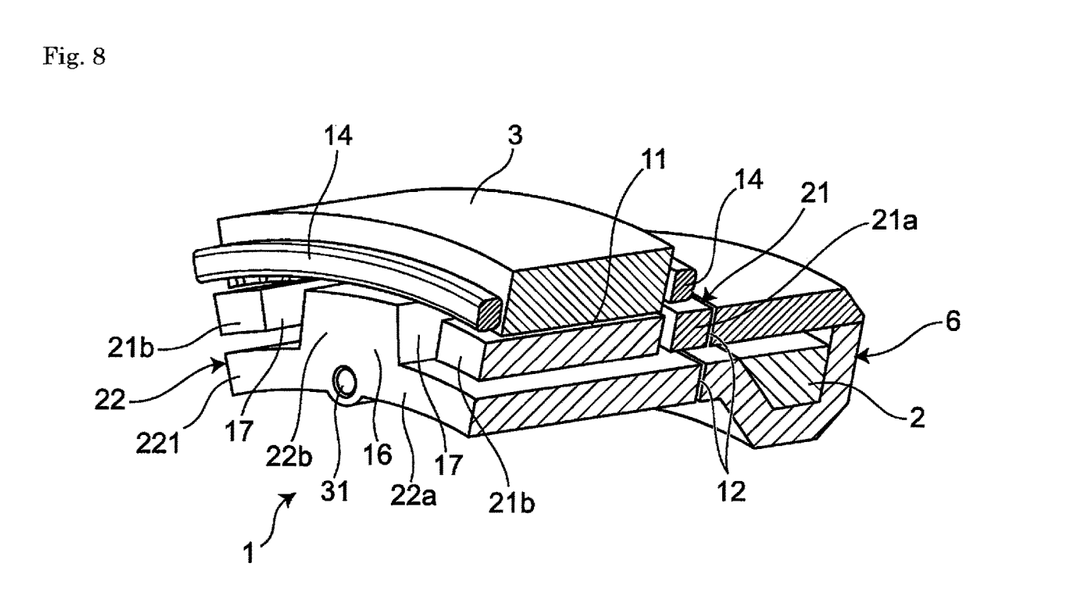
FIG. 8 is a perspective view of the rotational electric machine according to a second embodiment of the present invention when cut in the direction orthogonal to the rotational axis.
Figure 9:
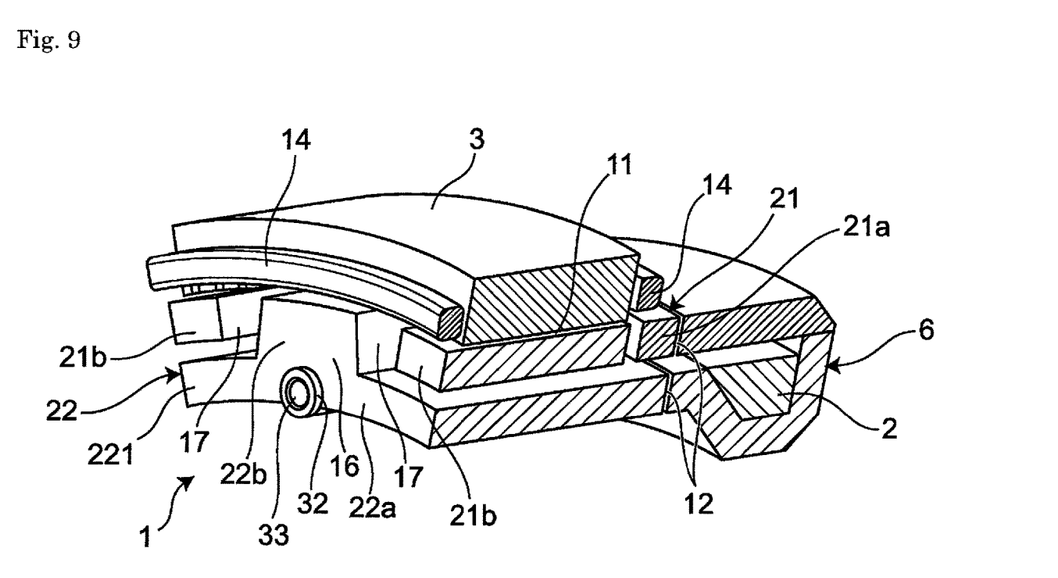
FIG. 9 is a perspective view of the rotational electric machine according to a modification of the second embodiment of the present invention when cut in the direction orthogonal to the rotational axis.

According to a second embodiment of the present invention, an annular stepped portion 32 may be provided to the connection portion 31 in the configuration of the first embodiment as illustrated in FIGS. 8 and 9.

More specifically, as illustrated in FIG. 8, when the connection portion 31 has a bolt shape, the stepped portion 32 is provided at an end portion of the connection portion on the second circular ring portion 22a side. As illustrated in FIG. 9, when the connection portion 31 has a nut shape, the stepped portion 32 is provided around an opening 33 on the facing surface 221 of the second circular ring portion 22a.

With this configuration, it is possible to increase the strength of the connection portion 31 and prevent magnetic short circuit from occurring between the first magnetic pole and the second magnetic pole when the connection portion 31 is made of a magnetic body such as iron. Accordingly, the rotor 1 can be more reliably connected to the synchronized rotation member 30 while adverse magnetic influence is prevented.

Any embodiments or modifications among various embodiments or modifications described above may be combined with each other as appropriate to achieve effects of each embodiment or modification. It is possible to combine embodiments, examples, or an embodiment and an example, and it is also possible to combine features in different embodiments or examples.

A rotational electric machine according to the aspect of the present invention is applicable to, for example, a vehicle or a power generation device.

DESCRIPTION OF REFERENCE SIGNS

1: Rotor
2: Field coil
3: Stator
4: Starting device
5: Case
6: Field core
7: Rotational axis
8: Engine
9: transmission
10: Brushless winding field rotational electric machine
11: First air gap
12: Second air gap
14: Alternating-current coil
15: Field coil magnetic flux
16: Radial direction gap
17: Circumferential direction gap
19: Axial direction gap
21: First magnetic pole
21a: First circular ring portion
21b: Pawl portion
22: Second magnetic pole
22a: Second circular ring portion
22b: Convex portion
22c: Second leading end lock portion
22d: Fitting portion
221: Facing surface
30: Synchronized rotation member
31: Connection portion
32: Stepped portion
33: Opening
89: Region of field coil shifted to engine side of stator

The invention claimed is:
1. A brushless winding field rotational electric machine positioned between a starting device and a case enclosing the starting device comprising:

a stator, which is held to the case, including an alternating-current coil configured to generate a rotation magnetic field by alternating current;

a field core, which is held to the case, including a field coil to be excited by direct current; and a rotor disposed on an outer periphery of the starting device and rotatably held about a rotational axis thereof relative to the stator and the field coil, the rotor including a first magnetic pole and a second magnetic pole, wherein the rotor further includes a plurality of connection portions to be connected to a synchronized rotation member configured to rotate in synchronization with an engine along the rotational axis, on a facing surface to the synchronized rotation member, the first magnetic pole includes a first circular ring and a plurality of protruding portions each protruding in an axial direction of the rotational axis from an end in the axial direction of the first circular ring portion, the second magnetic pole is disposed on an inner side of the first magnetic pole through a radial direction gap in a radial direction of the rotational axis, and the second magnetic pole includes a second circular ring portion disposed partially overlapping the first magnetic pole and a plurality of convex portions each protruding from an outer peripheral surface of the second circular ring portion in the radial direction of the rotational axis and each having a circumferential direction gap in a circumferential direction of the rotational axis, the first magnetic pole and the second magnetic pole are arranged without being in contact with each other, each of the plurality of protruding portions is inserted in the circumferential direction gap so that the protruding portions and the convex portions are alternately arranged in the circumferential direction of the rotational axis, and the plurality of connection portions are disposed on the facing surface of the second circular ring portion and on the inner side of the convex portion in the radial direction of the rotational axis.

2. The rotational electric machine according to claim 1, wherein each of the plurality of connection portions has portion have a bolt shape or a nut shape.

3. The rotational electric machine according to claim 2, wherein the rotor includes the plurality of connection portions disposed at intervals in the circumferential direction of the rotational axis.

4. The rotational electric machine according to claim 1, wherein the rotor includes the plurality of connection portions disposed at intervals in the circumferential direction of the rotational axis.

* * * * *